T. W. CROZIER.
NUT LOCKING WASHER.
APPLICATION FILED SEPT. 15, 1913.
1,099,027.
Patented June 2, 1914.
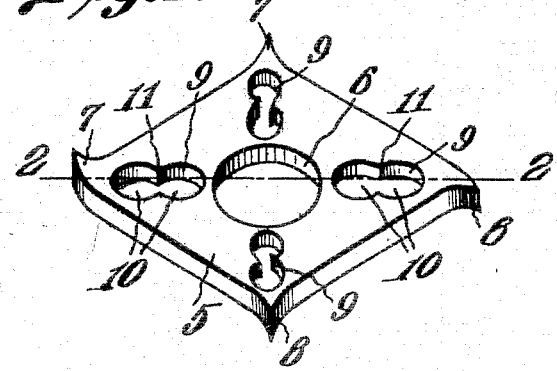
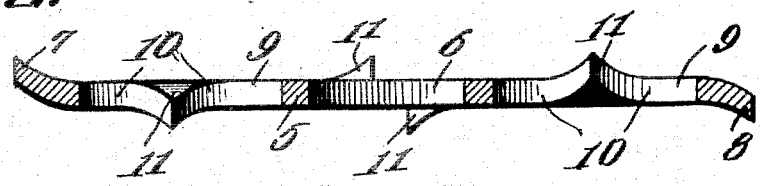
T. W. Crozier,
Inventor
Witnesses
by
Attorneys

UNITED STATES PATENT OFFICE.

THOMAS WASHINGTON CROZIER, OF CHRISTIANSBURG, VIRGINIA.

NUT-LOCKING WASHER.

1,099,027. Specification of Letters Patent. Patented June 2, 1914.

Application filed September 15, 1913. Serial No. 789,875.

*To all whom it may concern:*

Be it known that I, THOMAS W. CROZIER, a citizen of the United States, residing at Christiansburg, in the county of Montgomery and State of Virginia, have invented a new and useful Nut-Locking Washer, of which the following is a specification.

This invention has reference to a new and useful form of nut or bolt locking washer. One object of the present invention is to provide a plate formed of some strong and resilient material such as steel, and which is provided with an opening extending therethrough, through which the shank of a bolt may pass and spaced a distance from the said bolt opening are a number of apertures with downwardly and upwardly struck lips or projections adapted to engage the nut or bolt head and also the material through which the bolt extends, preventing the relative rotation of the bolt and nut.

A further object is to provide a nut locking washer with a number of apertures extending therethrough and which apertures are provided by forming two intersecting openings which intersect along a minor arc with the resulting inwardly extending limited lips bent upward and downward so as to engage the nut and also the material through which the bolt extends.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated, in which:—

Figure 1 is a view in perspective of my improved form of nut locking washer. Fig. 2 is a cross sectional view thereof, taken on the line 2—2.

Referring to the drawings in which similar reference numerals designate corresponding parts throughout the several views, 5 is a plate of square outline so as to conform to the outline of a square nut, though the contour of the plate 5 may be varied according to the shape of the nut with which it is to be used. The plate 5 is formed of metal and preferably one having a certain degree of resiliency and hardness.

The plate 5 which forms the washer is provided with the central opening 6 extending therethrough and through which the shank of the bolt passes when the washer is in a position to engage and lock a nut. The corners of plate 5 are bent oppositely at diametrically opposite points so as to form two upstanding corners 7 and two downwardly extending corners 8. The sides of the washer are such that the upstanding or downwardly extending corners will rigidly engage the nut, while the oppositely extending corners will bite into the material through which the bolt extends and which is being clamped thereby.

Located upon diagonal lines are a number of openings 9. Each of the openings 9 comprises two apertures 10—10 which intersect along minor arcs so as to form the inwardly extending lips 11. The inwardly projecting lips 11 are bent or struck in opposite directions, one of each pair adapted to engage the nut which bears against the outer surface of the washer and the opposite lip of each pair adapted to engage the material through which the bolt extends and into contact with which the washer is forcibly driven by the nut. Thus a secure locking action will be obtained by the biting of the lips or projections into the material which contacts therewith and due to the manner in which the lips or projections are formed a firm and sure purchase will be had thereupon.

The novel and desirable features of the present nut locking washer will be readily apparent from the foregoing description, among which may be mentioned the improved manner in which the sharpened lips 11 are provided. The abruptness of the same or pointedness may be changed as it will be apparent by varying the arc of intersection of the two apertures 10—10 to thus provide washers especially adapted for use with various materials, depending upon the hardness thereof.

Having thus described my invention, what I claim is:—

1. A nut locking washer comprising a plate provided with a bolt opening extending therethrough, said plate provided with a pair of apertures spaced from said bolt receiving opening and intersecting along minor arcs and forming lips, said lips struck out of the plane of said plate and adapted to engage a surface which is in contact therewith.

2. A nut locking washer comprising a plate provided with a bolt receiving opening extending therethrough, with a plurality of apertures spaced from said bolt receiving opening, arranged in pairs and intersecting along minor arcs to thereby define sharpened lips, said lips struck upwardly and downwardly and adapted to engage surfaces which are in contact with the said washer to prevent the rotation in one direction thereof.

3. A locking washer comprising a plate with a central bolt receiving opening extending therethrough, the opposite corners of said plate bent in opposite directions adapted to engage the surfaces which are in contact with said plate, the said plate provided with a plurality of apertures extending therethrough and arranged in pairs, the pairs of apertures intersecting along minor arcs to define inwardly extending lips, one lip of each pair bent upwardly, the opposite lip bent downwardly and adapted to engage the said surfaces and to limit the rotation thereof to one direction and adapted to prevent the opposite rotations thereof.

In testimony that I claim the foregoing as my own, I have hereto affixed my signature in the presence of two witnesses.

THOMAS WASHINGTON CROZIER.

Witnesses:
J. E. B. SMITH,
W. F. WALTERS.